United States Patent
Yang et al.

(10) Patent No.: US 9,767,725 B2
(45) Date of Patent: Sep. 19, 2017

(54) DISPLAY PANEL, DRIVING METHOD FOR DISPLAY PANEL, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ming Yang, Beijing (CN); Xue Dong, Beijing (CN); Xiaochuan Chen, Beijing (CN); Rui Xu, Beijing (CN); Lei Wang, Beijing (CN); Qian Wang, Beijing (CN); Peng Liu, Beijing (CN); Pengcheng Lu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 13 days.

(21) Appl. No.: 14/915,542

(22) PCT Filed: Sep. 21, 2015

(86) PCT No.: PCT/CN2015/090076
§ 371 (c)(1),
(2) Date: Feb. 29, 2016

(87) PCT Pub. No.: WO2016/161776
PCT Pub. Date: Oct. 13, 2016

(65) Prior Publication Data
US 2017/0061853 A1 Mar. 2, 2017

(30) Foreign Application Priority Data
Apr. 8, 2015 (CN) .......................... 2015 1 0163660

(51) Int. Cl.
*G09G 3/20* (2006.01)
*G02F 1/1362* (2006.01)
*G09G 3/22* (2006.01)

(52) U.S. Cl.
CPC ......... *G09G 3/2085* (2013.01); *G02F 1/1362* (2013.01); *G09G 3/20* (2013.01);
(Continued)

(58) Field of Classification Search
CPC .......... G09G 3/2085; G09G 3/20; G09G 3/22; G09G 2300/0804; G09G 2310/0297
See application file for complete search history.

(56) References Cited

U.S. PATENT DOCUMENTS 8,830,154 B2 * 9/2014 Wang .................. G09G 3/3677
345/100
9,489,066 B2 * 11/2016 Song ....................... G06F 3/038
(Continued)

FOREIGN PATENT DOCUMENTS

CN 101487962 A 7/2009
CN 102201215 A 9/2011
(Continued)

OTHER PUBLICATIONS

First Office Action regarding Chinese application No. 201510163660.6, dated Nov. 15, 2016. Translation provided by Dragon Intellectual Property Law Firm.
(Continued)

*Primary Examiner* — Vijay Shankar
(74) *Attorney, Agent, or Firm* — Harness, Dickey & Pierce, P.L.C.

(57) ABSTRACT

A display panel, a method for driving the display panel, and a display device are provided. The display panel includes a display region and a peripheral region surrounding the display region. Multiple gate lines each extending in a first direction and multiple data lines each extending in a second direction are arranged at the display region. A multiplexer is arranged at the peripheral region pointed by the second direction. The multiplexer is used to, under the control of
(Continued)

gate line ON signals from a gate line switching control line, input gate line signals from a source driver unit to corresponding gate lines in a time-division manner, and under the control of data line ON signals from corresponding data line switching control lines, input data signals from the source driver unit to corresponding data lines in a time-division manner.

2 Claims, 4 Drawing Sheets

(52) U.S. Cl.
CPC ....... *G09G 3/22* (2013.01); *G09G 2300/0804* (2013.01); *G09G 2310/0297* (2013.01)

(56) References Cited

U.S. PATENT DOCUMENTS

| | | | |
|---|---|---|---|
| 2013/0271357 A1* | 10/2013 | Wang | G09G 3/3677 345/92 |
| 2014/0104148 A1* | 4/2014 | Wang | G09G 5/00 345/92 |
| 2015/0002397 A1 | 1/2015 | Song | |

FOREIGN PATENT DOCUMENTS

| | | |
|---|---|---|
| CN | 102243838 A | 11/2011 |
| CN | 102376237 A | 3/2012 |
| CN | 102543028 A | 7/2012 |
| CN | 102621758 A | 8/2012 |
| CN | 102866551 A | 1/2013 |
| CN | 103927970 A | 7/2014 |
| CN | 104751766 A | 7/2015 |
| CN | 104900181 A | 9/2015 |
| KR | 20070041829 A | 4/2007 |
| KR | 20100069900 A | 6/2010 |

OTHER PUBLICATIONS

International Search Report and Written Opinion of the International Searching Authority for international application No. PCT/CN2015/090076, dated Sep. 21, 2015.

Second Office Action regarding Chinese Application No. 201510163660.6, dated Mar. 16, 2017. Translation provided by Dragon Intellectual Property Law Firm.

English translation of International Search Report regarding International Application No. PCT/CN2015/090076, mailed Nov. 24, 2015. Translation provided by Dragon Intellectual Property Law Firm.

* cited by examiner

DISPLAY PANEL, DRIVING METHOD FOR DISPLAY PANEL, AND DISPLAY DEVICE

CROSS-REFERENCE TO RELATED APPLICATIONS

The present application is a national phase of PCT Application No. PCT/CN2015/090076 filed on Sep. 21, 2015, which claims a priority of the Chinese patent application No. 201510163660.6 filed on Apr. 8, 2015, which are incorporated herein by reference in their entireties.

TECHNICAL FIELD

The present disclosure relates to the field of display technology, in particular to a display panel, a driving method for a display panel, and a display device.

BACKGROUND

Recently, the display technology has been widely applied to user-specific electronic products such as televisions and mobile phones, as well as to the display of public information. There are various display panels for providing colorful images. Usually, the display panel includes a source driver integrated circuit (IC) and a gate driver unit. The source driver IC takes charge of receiving and caching image data, converting a digital signal into an analog signal, and outputting the resultant analog signal to data lines of the display panel through an output buffer. The gate driver unit takes charge of progressively scanning gate lines, generating gate line scanning signals corresponding to the respective gate lines in accordance with timing control, and applying the gate line scanning signals sequentially to the corresponding gate lines so as to progressively turn on pixel switches corresponding to the respective gate lines, so as to enable the image data to enter a storage capacitor for pixels in each row, thereby displaying an image normally.

In an existing display panel, both the source driver IC and the gate driver unit are arranged at its peripheral region. The peripheral region occupies a large area of the display panel since the source driver IC and the gate driver unit are both arranged therein. As a result, a visual effect of the displayed image is adversely affected.

Hence, there is an urgent need for the skilled in the art to provide the display panel with a narrow bezel, so as to improve the visual effect of the displayed image.

SUMMARY

The present disclosure provides a display panel, a driving method for a display panel and a display device, with which a problem of adversely affected visual effect of a displayed image due to a large peripheral region of the display panel is solved.

The present disclosure provides in some embodiments a display panel, including a display region and a peripheral region surrounding the display region. Multiple gate lines each extending in a first direction and multiple data lines each extending in a second direction are arranged at the display region. A multiplexer is arranged at the peripheral region pointed by the second direction. Signal input ends of the multiplexer are connected to output ends of a source driver unit according to a one-to-one correspondence, first kind output ends of the multiplexer are connected to the data lines according to a one-to-one correspondence, second kind output ends of the multiplexer are connected to the gate lines according to a one-to-one correspondence, first kind control ends of the multiplexer are connected to data line switching control lines according to a one-to-one correspondence, and a second kind control end of the multiplexer is connected to a gate line switching control line. The multiplexer is used to, under the control of gate line ON signals from the gate line switching control line, input gate line signals output by the source driver unit to corresponding gate lines in a time-division manner, and under the control of data line ON signals from corresponding data line switching control lines, input data signals from the source driver unit to corresponding data lines in a time-division manner.

Optionally, in the display panel according to the embodiments of the present disclosure, the multiplexer includes first kind switching transistors corresponding to the data lines respectively, and second kind switching transistors corresponding to the gate lines respectively. Drain electrodes of the first kind switching transistors are respectively connected to the data lines, source electrodes thereof are respectively connected to the output ends of the source driver unit, and gate electrodes thereof are respectively connected to the data line switching control lines. Drain electrodes of the second kind switching transistors are respectively connected the gate lines, source electrodes thereof are respectively connected to the output ends of the source driver unit, and gate electrodes thereof are connected to the gate line switching control line.

Optionally, in the display panel according to the embodiments of the present disclosure, a number of the first kind control ends the multiplexer is identical to a number of subpixels in each pixel at the display region, and a number of the signal input ends of the multiplexer is identical to a number of columns of pixels at the display region.

Optionally, in the display panel according to the embodiments of the present disclosure, the number of the signal input ends of the multiplexer is identical to a number of the gate lines.

Optionally, in the display panel according to the embodiments of the present disclosure, the multiplexer includes multiple sub-multiplexers respectively corresponding to the columns of pixels at the display region. Each sub-multiplexer includes the first kind switching transistors at an amount identical to columns of subpixels in each column of pixels, and one second kind switching transistor.

Optionally, in the display panel according to the embodiments of the present disclosure, gate voltage storage capacitors are further arranged at the display region. The gate voltage storage capacitors respectively connect the second kind output ends of the multiplexer to corresponding gate lines.

Optionally, in the display panel according to the embodiments of the present disclosure, each gate voltage storage capacitor consists of a gate line and a common sub-electrode connected to each other, and the common sub-electrode is arranged at a layer identical to common electrodes of the pixels and is separated from the common electrodes of the pixels.

Optionally, in the display panel according to the embodiments of the present disclosure, the first direction is perpendicular to the second direction.

Optionally, in the display panel according to the embodiments of the present disclosure, the first kind transistors and the second kind transistors are thin film transistors (TFTs) or metal-oxide semiconductor field-effect transistors (MOSFETs).

The present disclosure provides in some embodiments a display device including the above-mentioned display panel.

The present disclosure provides in some embodiments a driving method for the above-mentioned display panel, including steps of: within a display duration of each frame, applying sequentially gate line ON signals at an amount identical to a number of gate lines to the second kind control ends of the multiplexer via a gate line switching control line, and applying a gate line signal to one signal input end of the multiplexer and applying a low level signal to the other signal input ends of the multiplexer via the output ends of the source driver unit every time when one gate line ON signal is applied, so as to enable the second kind output ends of the multiplexer to sequentially output gate line signals to the gate lines connected to the second kind output ends when the gate line ON signals are sequentially applied to the second kind control end of the multiplexer; and within a duration between two adjacent applications of the gate line ON signals to the second kind control ends of the multiplexer, applying data line ON signals sequentially to the first kind control ends of the multiplexer via the data line switching control lines, and applying data signals to the signal input ends of the multiplexer via the output ends of the source driver unit, so as to enable the first kind output ends of the multiplexer to sequentially output the data signals to the data lines connected to the first kind output ends.

Optionally, in the driving method according to the embodiments of the present disclosure, subsequent to, within the duration between two adjacent applications of the gate line ON signals to the second kind control ends of the multiplexer, applying the data line ON signals sequentially to the first kind control ends of the multiplexer via the data line switching control lines, the driving method further includes: applying a low level signal to the signal input ends of the multiplexer via the output ends of the source driver unit.

According to the embodiments of the present disclosure, it is unnecessary to provide a separate gate driver unit in the display panel, a gate driving function is integrated into the source driver unit and implemented by the multiplexer, and the gate lines are turned on and the data signals are inputted to the data lines in a time-division manner. As a result, it is able to reduce the peripheral region of the display panel, thereby providing the display panel with a narrow bezel and improving the visual effect of an image displayed on the display panel.

DETAILED DESCRIPTION OF THE EMBODIMENTS

Figure 1:
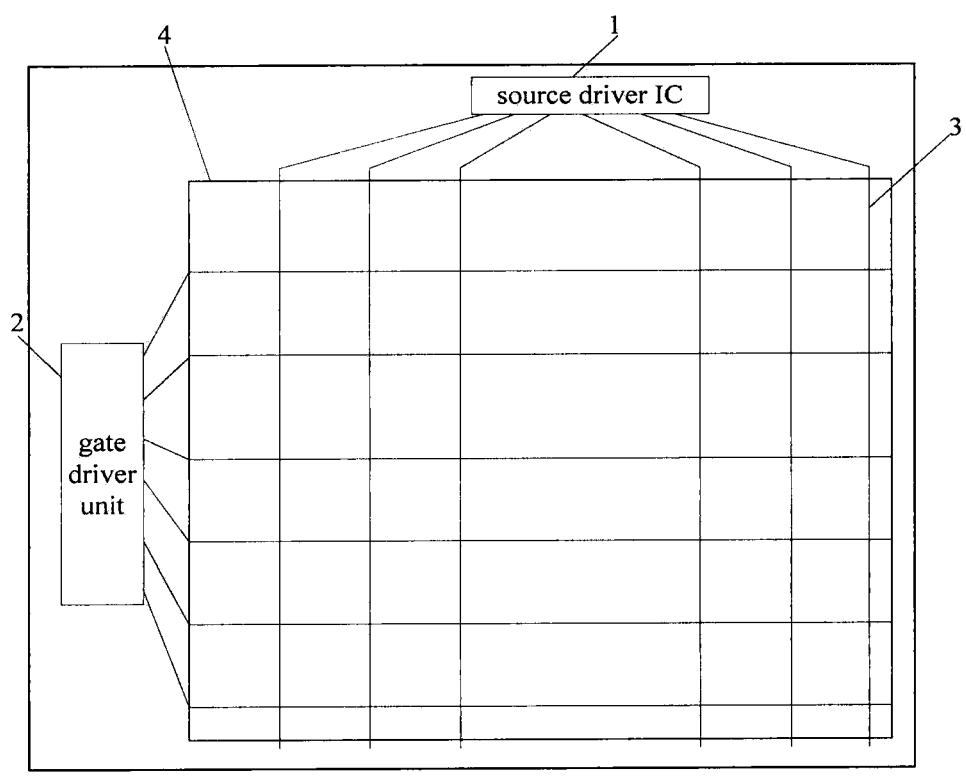
FIG. 1 is a schematic view showing an existing display panel.

In an existing display panel, usually a source driver IC is arranged at one of an upper end and a lower end of the display panel, and a gate driver unit is arranged at one of a left end and a right end of the display panel. As shown in FIG. 1, the source driver IC 1 is arranged at the upper end of the display panel, the gate driver unit 2 is arranged at the left end of the display panel, and data lines 3 and gate lines 4 perpendicular to each other are arranged at a display region of the display panel. Because both the source driver IC 1 and the gate driver unit 2 are arranged in a peripheral region of the display panel, the peripheral region occupies a large area of the display panel, and accordingly, a visual effect of a displayed image is adversely affected.

Specific implementations for a display panel, a driving method for a display panel and a display device provided in the present disclosure are detailed hereinafter in conjunction with drawings and embodiments.

Figure 2:
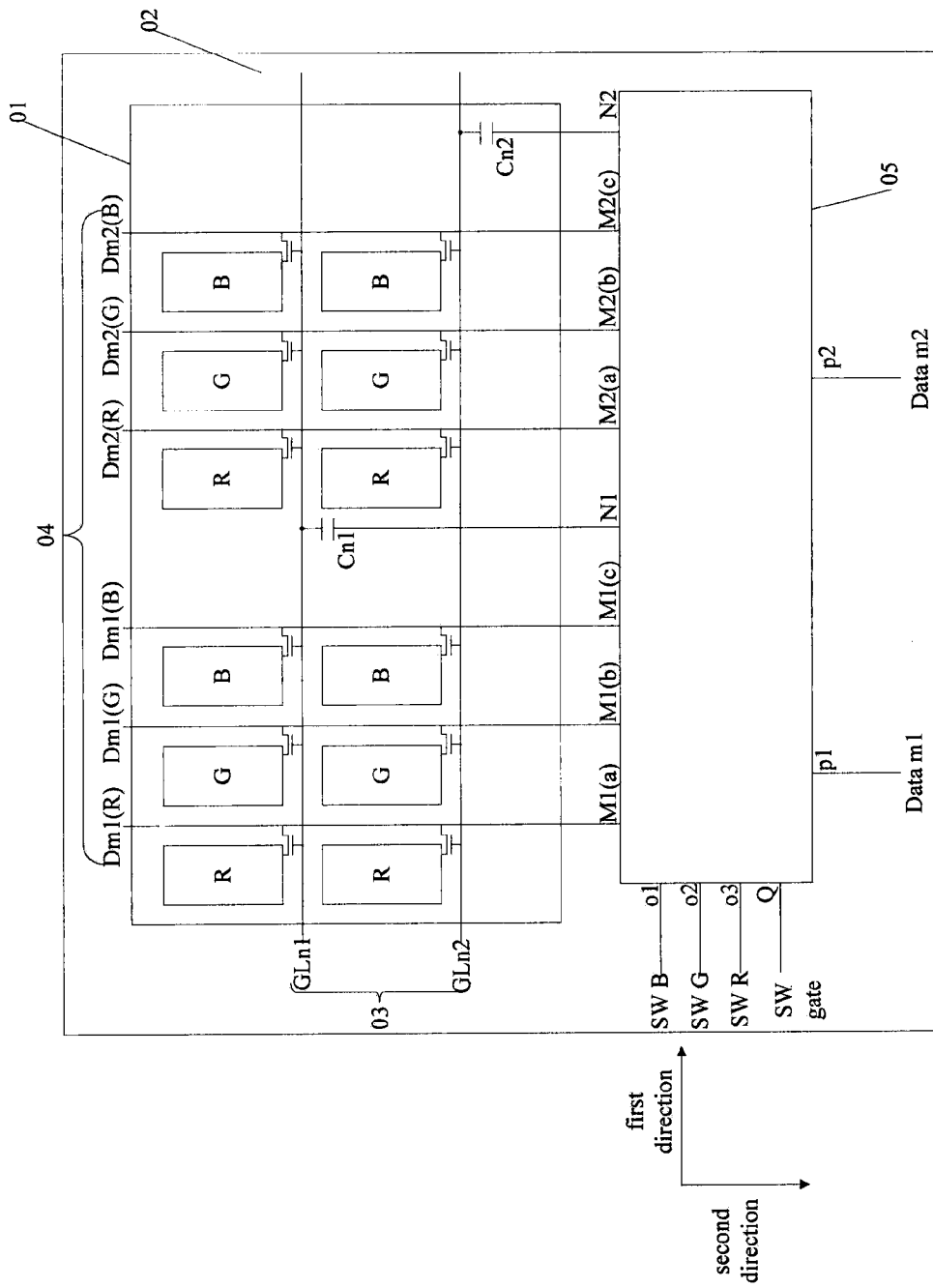
FIGS. 2-3 are schematic views showing a display panel according to an embodiment of the present disclosure.

The present disclosure provides in some embodiments a display panel which, as shown in FIG. 2, includes a display region 01 and a peripheral region 02 surrounding the display region 01. Multiple gate lines 03 each extending in a first direction and multiple data lines 04 each extending in a second direction are arranged at the display region 01.

A multiplexer 05 is arranged at the peripheral region 02 where pointed by the second direction, signal input ends p1 and p2 of the multiplexer 05 are correspondingly connected to output ends Data m1 and Data m2 of a source driver unit, first kind output ends M1($a$), M1($b$), M1($c$), M2($a$), M2($b$) and M2($c$) of the multiplexer 05 are connected to the data lines 04 according to a one-to-one correspondence, second kind output ends N1 and N2 of the multiplexer 05 are connected to the gate lines 03 according to a one-to-one correspondence, first kind control ends o1, o2 and o3 of the multiplexer 05 are connected to data line switching control lines SW B, SW G and SW R according to a one-to-one correspondence, and a second kind control end Q of the multiplexer 05 is connected to a gate line switching control line SW gate.

The multiplexer 05 is used to, under the control of gate line ON signals from the gate line switching control line SW gate, input gate line signals output by the source driver unit to corresponding gate lines 03 in a time-division manner; and to, under the control of data line ON signals from the data line switching control lines SW B, SW and SW R, input data signals output by the source driver unit to corresponding data lines 04 in a time-division manner.

According to the embodiments of the present disclosure, it is unnecessary to provide a separate gate driver unit in the display panel, a gate driving function is integrated into the source driver unit and implemented by the multiplexer, and the gate lines are turned on and the data signal is inputted to the data lines in a time-division manner. As a result, it is able to reduce the peripheral region of the display panel, thereby providing the display panel with a narrow bezel and improving the visual effect of an image displayed on the display panel.

Further, in order to ensure that, after the gate line signal from the source driver unit is inputted by the multiplexer 05 to the corresponding gate line 03 under the control of the gate line ON signal from the gate line switching control line SW gate, the gate line signal can be continuously applied to the gate line 03 until pixels connected to the gate line 03 have been charged, as shown in FIG. 2, in the display panel according to the embodiments of the present disclosure, gate voltage storage capacitors Cn1 and Cn2 may also be arranged at the display region, where the gate voltage storage capacitors Cn1 and Cn2 respectively connect the second kind output end N1 and N2 of the multiplexer 05 to corresponding gate lines 03. The gate voltage storage capacitors are separated from each other. Optionally, each of the gate voltage storage capacitor Cn1 and Cn2 has a capacitance of several pF to several hundred pF.

During practical implementation, each of the gate voltage storage capacitors Cn1 and Cn2 may consist of the gate line 03 and a common sub-electrode connected to each other, and the common sub-electrode is arranged at a layer identical to common electrodes of respective pixels and is separated from the common electrodes of respective pixels. In this way, the gate voltage storage capacitors can be formed without any additional process in forming the display panel, and meanwhile an aperture ratio of each pixel may not be decreased. Of course, in some other embodiments, a new film may be added in the display panel, and the gate voltage storage capacitors may be formed using the new film and the gate lines.

Figure 3:
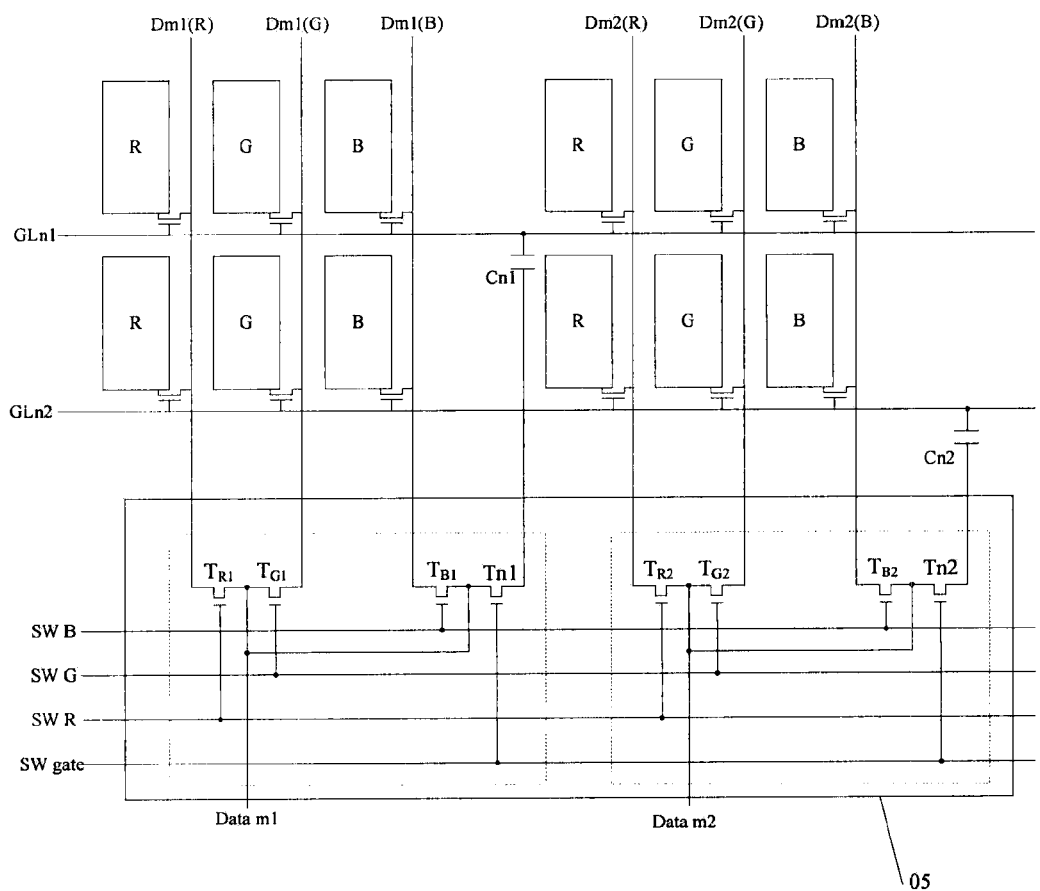

During practical implementation, as shown in FIG. 3, the multiplexer 05 in the display panel according to the embodiments of the present disclosure may include first kind switching transistors $T_{R1}$, $T_{R2}$, $T_{G1}$, $T_{G2}$, $T_{B1}$ and $T_{B2}$ respectively corresponding to the data lines 04, and second kind switching transistors $T_{n1}$ and $T_{n2}$ respectively corresponding to the gate lines 03.

Drain electrodes of the first kind switching transistors $T_{R1}$, $T_{R2}$, $T_{G1}$, $T_{G2}$, $T_{B1}$ and $T_{B2}$ are respectively connected to the data lines 04, source electrodes thereof are respectively connected to the output ends Data m1 and Data m2 of the source driver unit, and gate electrodes thereof are respectively connected to the data line switching control lines SW B, SW G and SW R. Drain electrodes of the second kind switching transistors $T_{n1}$ and $T_{n2}$ are respectively connected to the gate lines 03, source electrodes thereof are respectively connected to the output ends Data m1 and Data m2 of the source driver unit, and gate electrodes thereof are connected to the gate line switching control line SW gate.

To be specific, the first kind switching transistors $T_{R1}$, $T_{R2}$, $T_{G1}$, $T_{G2}$, $T_{B1}$ and $T_{B2}$ are turned on when the data line ON signals are applied to the data line switching control lines SW B, SW G and SW R connected thereto, so as to apply the current data signals from the output ends Data m1 and Data m2 of the source driver unit connected to the source electrodes of the first kind switching transistors to the corresponding data lines 04 via the first kind switching transistors $T_{R1}$, $T_{R2}$, $T_{G1}$, $T_{G2}$, $T_{B1}$ and $T_{B2}$, thereby charging the data lines 04. The second kind switching transistors $T_{n1}$ and $T_{n2}$ are turned on when the gate line ON signal is applied to the gate line switching control line SW gate connected thereto, so as to apply the current gate line signals from the output ends Data m1 and Data m2 of the source driver unit connected to the source electrodes of the second kind switching transistors to the corresponding gate lines 03 via the second kind switching transistors $T_{n1}$ and $T_{n2}$, thereby charging the gate lines 03.

Further, as can be seen from the connection relationships of the first kind switching transistors $T_{R1}$, $T_{R2}$, $T_{G1}$, $T_{G2}$, $T_{B1}$ and $T_{B2}$ and the second kind switching transistors $T_{n1}$ and $T_{n2}$ as well as the operation principles thereof, the source electrodes of these switching transistors are all connected to the output ends Data m1 and Data m2 of the source driver unit. In order to ensure the application of the signals from the output ends Data m1 and Data m2 of the source driver unit to the corresponding gate lines 03 or data lines 04 in an accurate manner, during the implementation, usually the data line ON signals and the gate line ON signals are applied in a time-division manner to the data line switching control lines SW B, SW G and SW R and the gate line switching control line SW gate, so as to turn on the first kind switching transistors $T_{R1}$, $T_{R2}$, $T_{G1}$, $T_{G2}$, $T_{B1}$ and $T_{B2}$ and the second kind switching transistors $T_{n1}$ and $T_{n2}$ in a time-division manner.

It should be appreciated that, FIG. 3 merely shows two columns of pixels, two gate lines, two output ends of the source driver unit and two input ends of the multiplexer. In the actual application, the display panel may include multiple columns of pixels and multiple gate lines, the source driver unit may include multiple output ends, and the multiplexer may include multiple input ends, where the specific quantities thereof are not limited in the present disclosure.

Further, the number of interfaces of the multiplexer at the peripheral region of the display panel is in direct proportion to the complexity of the process for manufacturing the display panel. During the implementation, in order to reduce the number of the output ends of the source driver unit as possible, i.e., to reduce the number of the signal input ends of the multiplexer 05, thereby simplifying the circuit, usually the number of the signal input ends of the multiplexer 05 is set identical to the number of columns of the pixels at the display region. In this way, the data signal from one output end of the source driver unit may be applied to the data lines corresponding to subpixels in one column of pixels in a time-division manner. Correspondingly, the number of the first kind control ends of the multiplexer 05, i.e., the number of the data line switching control lines, is identical to the number of the subpixels in each pixel at the display region.

For the display panel in FIG. 3, each column of pixels consists of three columns of subpixels R, G and B, so three data line switching control lines SW B, SW G and SW R are provided so as to apply the data line ON signals in a time-division manner. The data signal from one output end of the source driver unit may be applied to the data lines corresponding to the three columns of subpixels via the multiplexer 05 in a time-division manner.

Further, during the implementation, the number of the signal input ends of the multiplexer 05 may be set identical to the number of the gate lines 03. In this way, the source electrodes of second kind switching transistors connected to the gate lines 03 according to a one-to-one correspondence may be connected to the output ends of the source driver unit according to a one-to-one correspondence. When the gate line ON signal is applied via the gate line switching control line SW gate, the desired gate lines 03 are selectively turned on through the gate line signals from the output ends of the source driver unit. Of course, during the implementation, the number of the signal input ends of the multiplexer 05 may also be greater than the number of the gate lines 03, which is not detailed herein.

During the implementation, the multiplexer 05 in the display panel according to the embodiments of the present disclosure may include multiple sub-multiplexers, e.g., each sub-multiplexer includes one input end of the multiplexer. As shown in FIG. 3, the data signal is applied to one column of subpixels in a time-division manner via one input end of the multiplexer 05, the multiplexer 05 may include multiple sub-multiplexers corresponding to the multiple columns of pixels at the display region respectively. For example, the multiplexer 05 includes two sub-multiplexers on a left side and a right side as shown in dashed boxes; in this way, each sub-multiplexer includes the first kind switching transistors at an amount identical to the columns of the subpixels in each column of pixels, and one second kind switching transistor. In FIG. 3, for each sub-multiplexer, the source electrodes of the three first kind switching transistors and the one second kind switching transistor are all connected to one output end of the source driver unit. In this way, it is able to apply the signal from the output end to the corresponding gate line and data lines via the sub-multiplexer.

It should be appreciated that, the switching transistors mentioned above may be thin film transistors (TFTs), or metal-oxide semiconductor filed-effect transistors (MOS- FETs), specific types are not limited herein. During the implementation, the source electrode and the drain electrode of each switching transistor may be replaced with each other. In the above-mentioned embodiments, the TFT is taken as an example.

Based on an identical inventive concept, the present disclosure further provides in some embodiments a driving method for the above-mentioned display panel, which includes steps of:

within a display duration of each frame, applying sequentially the gate line ON signals at an amount identical to the number of the gate lines to the second kind control end of the multiplexer via the gate line switching control line, and applying a gate line signal to one signal input end of the multiplexer and applying a low level signal to the other signal input end(s) of the multiplexer via the output ends of the source driver unit every time when one gate line ON signal is applied, so as to enable the second kind output ends of the multiplexer to sequentially output the gate line signals to the gate lines connected to the second kind output ends when the gate line ON signals are sequentially applied to the second kind control end of the multiplexer; and within a duration between two adjacent applications of the gate line ON signals to the second kind control end of the multiplexer, applying the data line ON signals sequentially to the first kind control ends of the multiplexer via the data line switching control lines and applying the data signals to the signal input ends of the multiplexer via the output ends of the source driver unit, so as to enable the first kind output ends of the multiplexer to sequentially output the data signals to the data lines connected to the first kind output ends.

Further, subsequent to, within the duration between two adjacent applications of the gate line ON signals to the second kind control end of the multiplexer, applying the data line ON signals sequentially to the first kind control ends of the multiplexer via the data line switching control lines, the driving method according to embodiments of the present disclosure further includes: applying a low level signal to the signal input ends of the multiplexer via the output ends of the source driver unit, to ensure reset of signals on the gate lines.

Figure 4:
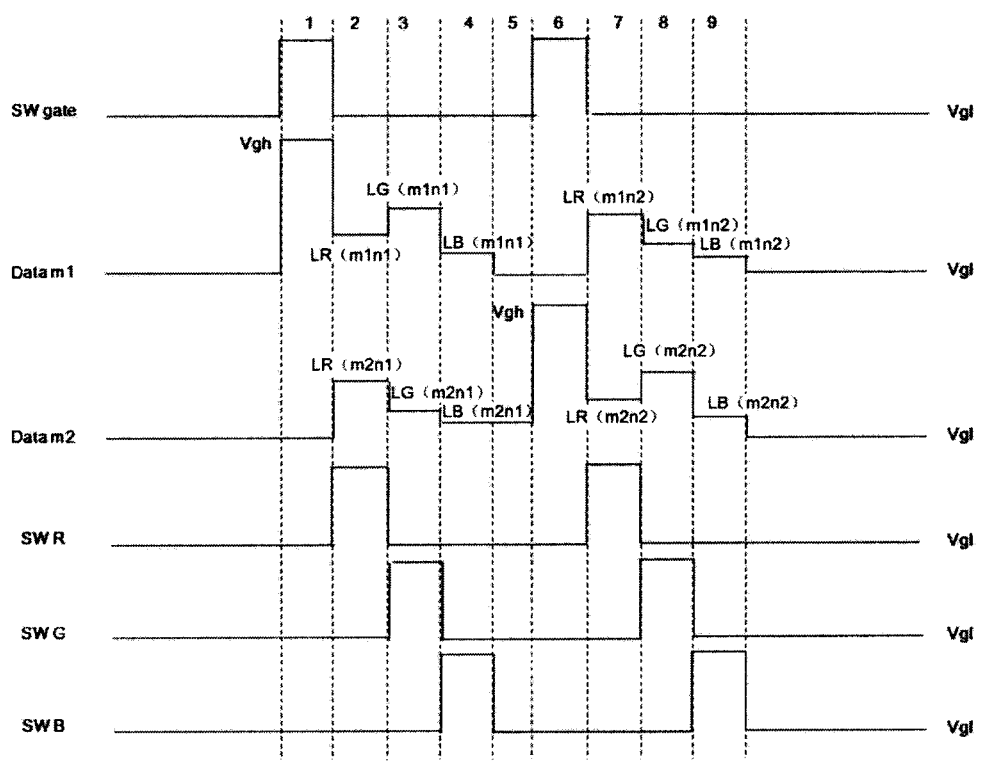
FIG. 4 is a sequence diagram for a display panel according to an embodiment of the present disclosure.

The driving method for the display panel is described hereinafter in more details in conjunction with the structure of the display panel in FIG. 3 and the sequence diagram in FIG. 4 for the display panel in FIG. 3.

At a first stage, a high voltage is applied to the gate line switching control line SW gate, so as to control the second kind switching transistors $T_{n1}$ and $T_{n2}$ to be turned on. At this time, the gate voltage storage capacitor Cn1 is charged by a high voltage Vgh from the output end Data m1 of the source driver unit, so as to pull up a voltage across the gate line GLn1. At the end of the first stage, the voltage across the gate line GLn1 reaches a maximum value. After the first stage, the voltage across the gate line GLn1 is maintained under the effect of the gate voltage storage capacitor Gn1. At the first stage, apart from the signal from the output end Data m1 of the source driver unit, a signal from the output end Data m2 is at a low level, so the gate line GLn2 is in a pull-down and resetting state, although the second kind switching transistor $T_{n2}$ is turned on.

At a second stage, a low voltage is applied to the gate line switching control line SW gate, so as to control the second kind switching transistor $T_{n1}$ to be turned off. A high voltage is applied to the data line switching control line SW R, so as to control the first kind switching transistors $T_{R1}$ and $T_{R2}$ connected to the data line switching control line SW R to be turned on, thereby applying the signals from the output ends Data m1 and Data m2 of the source driver unit to the corresponding data lines Dm1 (R) and DM2 (R). At this time, the gate GLn1 is maintained in an on state, so the subpixels connected to the data lines Dm1 (R) and Dm2 (R) can be charged, so as to enable red subpixels in a row where GLn1 is located and in columns where Dm1 (R) and Dm2 (R) are located to reach grayscales LR (m1n1) and LR (m2n1) respectively.

At a third stage, a high voltage is applied to the data line switching control line SW G, so as to control the first kind switching transistor $T_{G1}$ and $T_{G2}$ connected to the data line switching control line SW G to be turned on, thereby applying the signals from the output ends Data m1 and Data m2 of the source driver unit to the corresponding data lines Dm1 (G) and Dm2 (G). At this time, the gate line GLn1 is maintained in the on state, so it is able to charge subpixels connected to the data lines Dm1 (G) and Dm2 (G), thereby enabling green subpixels in a row where GLn1 is located and in columns where Dm1 (G) and Dm2 (G) are located to reach grayscales LG (m1n1) and LG (m2n1) respectively.

At a fourth stage, a high voltage is applied to the data line switching control line SW B, so as to control the first kind switching transistors $T_{B1}$ and $T_{B2}$ connected to the data line switching control line SW B to be turned on, thereby applying the signals from the output ends Data m1 and Data m2 of the source driver unit to the corresponding data line Dm1 (B) and Dm2 (B). At this time, the gate line GLn1 is maintained in the on state, so it is able to change the subpixels connected to the data lines Dm1 (B) and Dm2 (B), thereby enabling blue subpixels in a row where GLn1 is located and in columns where Dm1 (B) and Dm2 (B) are located to reach grayscales LB (m1n1) and LB (m2n1) respectively.

At a fifth stage, a low voltage is applied to each of the gate line switching control line SW gate and the data line switching control lines SW R, SWG and SW B, and the signals from the output ends Data m1 and Data m2 of the source driver unit are both at a low voltage. In this way, it is able to release charges stored in the gate voltage storage capacitor Cn1, thereby further pulling down the voltage across the gate line GLn1. It should be appreciated that, the fifth stage takes a relatively short time; optionally, this time may be 0.

At a sixth stage, a high voltage is applied to the gate line switching control line SW gate, so as to control the second kind switching transistors $T_{n1}$ and $T_{n2}$ to be turned on. At this time, the gate voltage storage capacitor Cn1 is discharged due to a low voltage Vg1 applied to the output end Data m1 of the source driver unit, so as to pull down the voltage across the gate line GLn1. The gate voltage storage capacitor Cn2 is charged due to a high voltage Vgh applied to the output end Data m2 of the source driver unit, so as to pull up a voltage across the gate line GLn2. At the end of the sixth stage, the voltage across the gate line GLn2 reaches a maximum value. After the sixth stage, the voltage across the gate line GLn2 is maintained under the affect of the gate voltage storage capacitor Cn2.

At a seventh stage, a low voltage is applied to the gate line switching control line SW gate, so as to control the second kind switching transistor $T_{n2}$ to be turned off. A high voltage is applied to the data line switching control line SW R, so as to control the first kind switching transistors $T_{R1}$ and $T_{R2}$ connected to the data line switching control line SW R to be turned on, thereby applying the signals from the output ends Data m1 and Data m2 of the source driver unit to the corresponding data lines Dm1 (R) and Dm2 (R). At this time, the gate line GLn2 is maintained in an on state, so it is able to charge the subpixels connected to the data lines Dm1 (R) and Dm2 (R), thereby enabling red subpixels in a row where GLn2 is located and in columns where Dm1 (R) and Dm2 (R) are located to reach grayscales LR (m1n2) and LR (m2n2) respectively.

At an eighth stage, a high voltage is applied to the data line switching control line SW G, so as to control the first kind switching transistors $T_{G1}$ and $T_{G2}$ connected to the data line switching control line SW G to be turned on, thereby applying the signals from the output ends Data m1 and Data m2 of the source driver unit to the corresponding data lines Dm1 (G) and Dm2 (G). At this time, the gate line GLn2 is maintained in the on state, so it is able to charge the subpixels connected to the data lines Dm1 (G) and Dm2 (G), thereby enabling green subpixels in a row where GLn2 is located and in columns where Dm1 (G) and Dm2 (G) are located to reach grayscales LG (m1n2) and LG (m2n2) respectively.

At a ninth stage, a high voltage is applied to the data line switching control line SW B, so as to control the first kind switching transistors $T_{B1}$ and $T_{B2}$ connected to the data line switching control line SW B to be turned on, thereby applying the signals from the output ends Data m1 and Data m2 of the source driver unit to the corresponding data lines Dm1 (B) and Dm2 (B). At this time, the gate line GLn2 is maintained in the on state, so it is able to charge subpixels connected to the data lines Dm1 (B) and Dm2 (B), thereby enabling blue subpixels in a row where GLn2 is located and in columns where Dm1 (B) and Dm2 (B) are located to reach grayscales LB (m1n2) and LB (m2n2) respectively.

Then, the above stages with respect to the pixels in two rows may be repeated with respect to the pixels in other rows, which are not repeated herein. It should be appreciated that, in the above description concerning the first stage to the ninth stage, it is explained based on a case that the switching transistors are active at a high level. During the actual application, the switching transistors may be active at a low level, or parts of the switching transistors may be active at a low level while parts of the switching transistors may be active at a high level, which is not limited herein.

Based on an identical inventive concept, the present disclosure further provides in some embodiments a display device including the above-mentioned display panel. The display device may be any product or member having a display function, such as a mobile phone, a flat-panel computer, a television, a display, a laptop computer, a digital photo frame or a navigator. Implementations of the display device may be understood with reference to the implementations of the display panel.

The present disclosure provides, in the embodiments, the display panel, the driving method for the display panel and the display device. The display panel includes the display region and the peripheral region surrounding the display region. Multiple gate lines each extending in the first direction and multiple data lines each extending in the second direction are arranged at the display region. The multiplexer is arranged at the peripheral region where pointed by the second direction, the signal input ends of the multiplexer are connected to the output ends of the source driver unit according to a one-to-one correspondence, the first kind output ends of the multiplexer are connected to the data lines according to a one-to-one correspondence, the second kind output ends of the multiplexer are connected to the gate lines according to a one-to-one correspondence, the first kind control ends of the multiplexer are connected to the data line switching control lines according to a one-to-one correspondence, and the second kind control end of the multiplexer are connected to the gate line switching control line. The multiplexer is used to, under the control of the gate line ON signal from the gate line switching control line, input the gate line signals output by the source driver unit to the corresponding gate lines in a time-division manner, and under the control of the data line ON signals from the corresponding data line switching control lines, input the data signals from the source driver unit to the corresponding data lines in a time-division manner. In the display panel according to the embodiments of the present disclosure, it is unnecessary to provide a separate gate driver unit in the display panel, a gate driving function is integrated into the source driver unit and implemented by the multiplexer, and the gate lines are turned on and the data signals are inputted to the data lines in a time-division manner. As a result, it is able to reduce the peripheral region of the display panel, thereby providing the display panel with a narrow bezel and improving the visual effect of an image displayed on the display panel.

Obviously, a person skilled in the art may make further modifications and variants without departing from the mind and scope of the present disclosure, and these modifications and variants shall be included in the present disclosure if they fall within the scope of claims of the present disclosure and equivalent technologies.

What is claimed is:

1. A driving method for a display panel, wherein the display panel comprises a display region and a peripheral region surrounding the display region, a plurality of gate lines each extending in a first direction and a plurality of data lines each extending in a second direction being arranged at the display region, wherein a multiplexer is arranged at the peripheral region pointed by the second direction, signal input ends of the multiplexer are connected to output ends of a source driver unit according to a one-to-one correspondence, first kind output ends of the multiplexer are connected to the data lines according to a one-to-one correspondence, second kind output ends of the multiplexer are connected to the gate lines according to a one-to-one correspondence, first kind control ends of the multiplexer are connected to data line switching control lines according to a one-to-one correspondence, and a second kind control end of the multiplexer is connected to a gate line switching control line, and the multiplexer is configured to, under the control of gate line ON signals from the gate line switching control line, input gate line signals output by the source driver unit to corresponding gate lines in a time-division manner, and under the control of data line ON signals from corresponding data line switching control lines, input data signals from the source driver unit to corresponding data lines in a time-division manner, wherein the driving method comprises:

within a display duration of each frame, applying sequentially gate line ON signals at an amount identical to a number of gate lines to the second kind control ends of the multiplexer via the gate line switching control line, and applying a gate line signal to one signal input end of the multiplexer and applying a low level signal to the other signal input ends of the multiplexer via the output ends of the source driver unit every time when one gate line ON signal is applied, so as to enable the second kind output ends of the multiplexer to sequentially output gate line signals to the gate lines connected to the second kind output ends when the gate line ON signals are sequentially applied to the second kind control end of the multiplexer; and within a duration between two adjacent applications of the gate line ON signals to the second kind control ends of the multiplexer, applying data line ON signals sequentially to the first kind control ends of the multiplexer via the data line switching control lines and applying the data signals to the signal input ends of the multiplexer via the output ends of the source driver unit, so as to enable the first kind output ends of the multiplexer to sequentially output the data signals to the data lines connected to the first kind output ends.

2. The method according to claim 1, wherein subsequent to, within the duration between two adjacent applications of the gate line ON signals to the second kind control ends of the multiplexer, applying the data line ON signals sequentially to the first kind control ends of the multiplexer via the data line switching control lines, the driving method further comprises:

applying a low level signal to the signal input ends of the multiplexer via the output ends of the source driver unit.

* * * * *